March 25, 1924.

J. L. BERNARD

CHUCK

Filed Feb. 28, 1923

Witnesses:

Inventor:
JAMES L. BERNARD,
by
his Attorney.

Patented Mar. 25, 1924.

1,487,708

UNITED STATES PATENT OFFICE.

JAMES L. BERNARD, OF BEAVER, PENNSYLVANIA.

CHUCK.

Application filed February 28, 1923. Serial No. 621,851.

*To all whom it may concern:*

Be it known that I, JAMES L. BERNARD, a citizen of the United States, and resident of Beaver, in the county of Beaver and State of Pennsylvania, have invented certain new and useful Improvements in Chucks, of which the following is a specification.

This invention relates to chucks and more particularly to chucks of the type used in attaching the tapering shank of a drill or other rotary tool to the driving spindle of a drill press or similar machine tool.

One object of my invention is to provide a chuck having a driving portion adapted to be attached to the spindle of the operating machine and a driven portion adapted to receive the drill or other tool, and having a driving connection between said portions whereby the driven and driving portions are disconnected when the drill or other tool is not in cutting engagement with the work.

Another object of the invention is to provide a supplemental driving connection between the driving and driven portions of the chuck which is under the control of the operator, and which will connect the said driving and driven portions at the will of the operator.

A still further object of the invention is to provide a chuck having the novel construction, arrangement and combination of parts described in the following specification, illustrated in the accompanying drawings, and particularly pointed out in the appended claims.

In the drawings, forming part of this specification, Figure 1 is a side elevation, partly in section, showing a drill chuck constructed in accordance with this invention.

Figure 1:
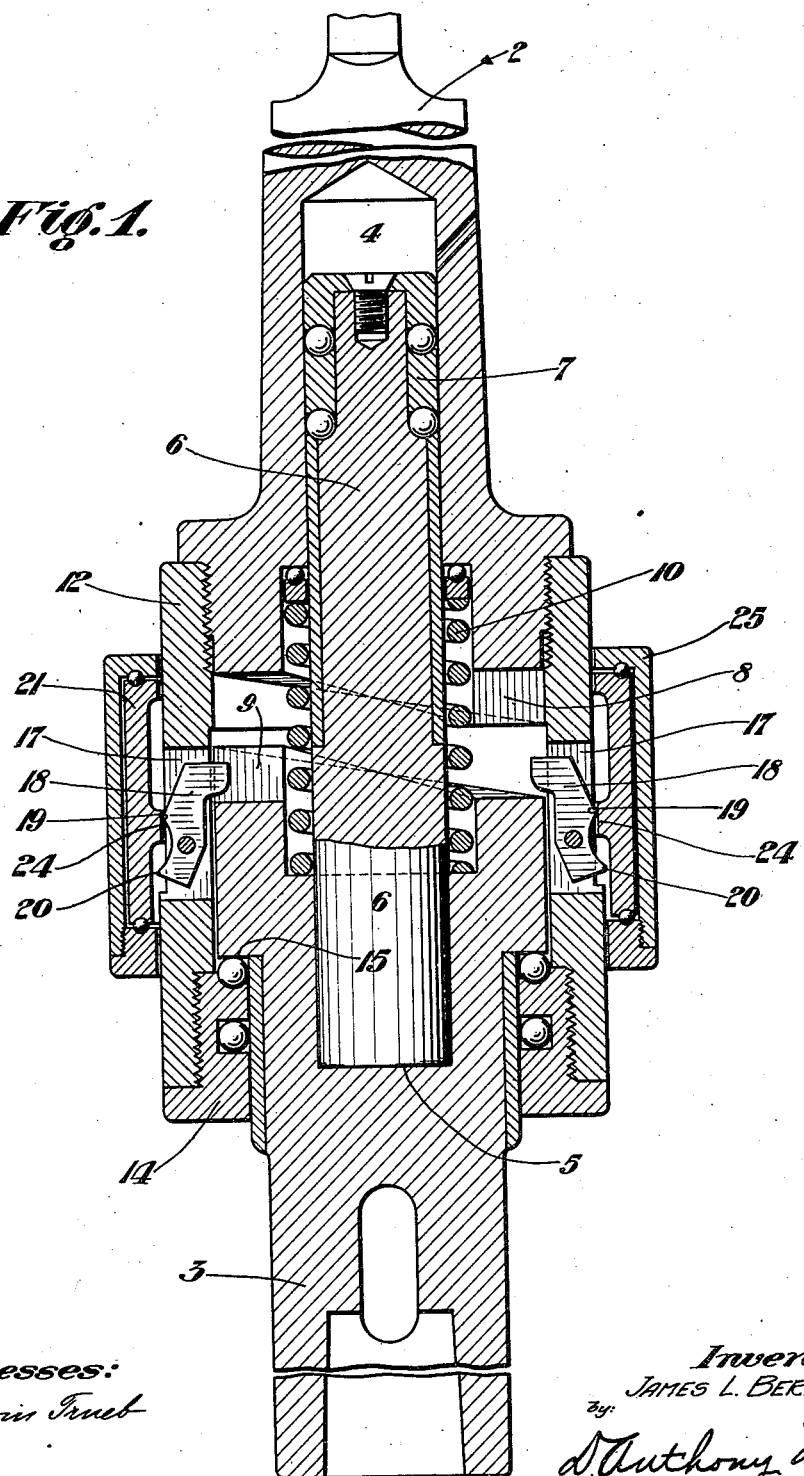
Figure 2:
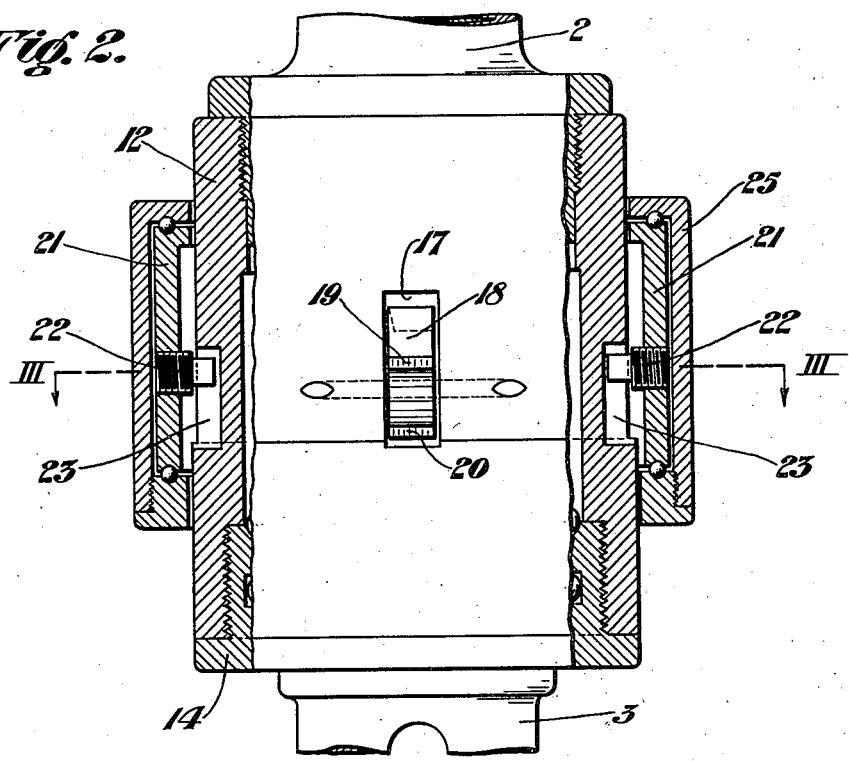
Figure 2 is a detail sectional elevation illustrating parts of the supplemental driving connection.
Figure 3:
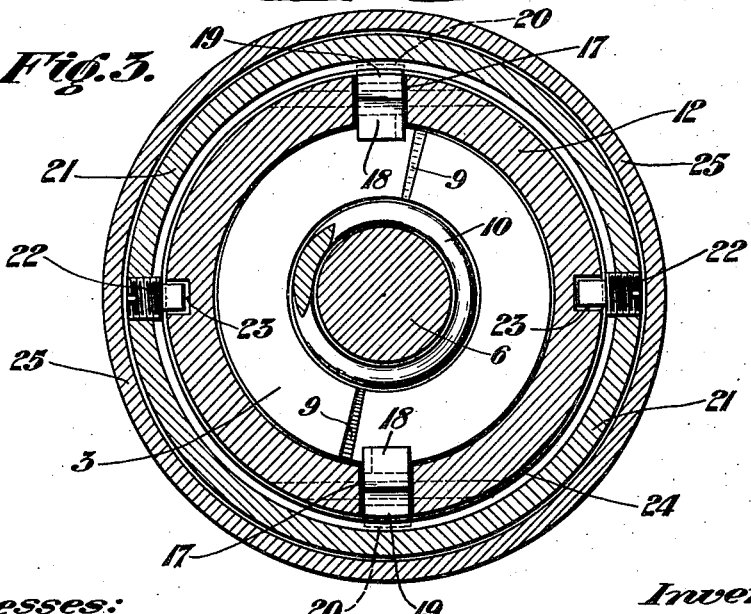
Figure 3 is a transverse section on the line III—III of Figure 2.

Referring more particularly to the drawings, the numeral 2 designates the shank member of the chuck, and 3 the socket or tool receiving member thereof. The shank member 2 and the socket member 3 are provided with longitudinally alined, counterbored sockets or recesses 4 and 5, respectively, opening from their inner ends, and a guide pin 6 is mounted therein. The shank member 2 of the chuck is the driving member, and in order to prevent any driving force being imparted to the socket member 3 by the pin 6 a suitable anti-friction bearing 7 is mounted on the upper end of the pin between the pin and the side walls of the recess 4.

The inner or adjacent ends of the shank member 2 and socket member 3 are provided with cooperating jaw clutch faces 8 and 9, respectively, the jaw faces being adapted to interlock when the tool carried by the chuck is in cutting engagement with the work. A helical spring 10, mounted on the pin 6, engages the shank and socket members 2 and 3 so as to normally force these members away from each other and prevent interlocking engagement of the clutch faces thereof. In operation, when the drill or other tool is forced into contact with the work, the members 2 and 3 of the chuck will be moved toward each other until the adjacent jaw clutch faces thereof are in engagement, and in this position the shank member 2 will drive the socket member 3. When the rotating drill or other tool held by the chuck is being retracted, so as to be out of cutting engagement with the work, or when it passes through the work, the spring 10 acts to move the members 2 and 3 apart, thus breaking the connection between the jaws on the clutch faces thereof, and the jaws being disconnected rotation of the socket member and the tool held thereby will stop.

A threaded sleeve member 12 is screwed on the end of the shank member 2 nearest the socket member 3, and telescopically receives the opposite end of the socket member. A threaded anti-friction bearing member 14 is screwed into the internally threaded counterbore in the lower end of the sleeve 12 and forms a shoulder portion adapted to contact with an annular shoulder 15 formed on the end of the member 3 to limit the relative lengthwise movement of the members 2 and 3, and the anti-friction bearing prevents the transmission of any driving force by the sleeve 12 to the member 3.

The sleeve member 12 is provided with diametrically opposite slots 17 in which are pivotally mounted clutch dogs 18 adapted to be moved into and out of engagement with the clutch face 9 of the socket member 3. The rear or outside faces of the dogs 18 are cut away to form a cam surface with operating points 19 and 20, one above and one below the pivot point of said dogs. A dog shifting member 21 is slidably mounted on the sleeve 12 and is limited in its movement by set screw members 22 screwed into the member 21 and projecting into slots 23 formed in the sleeve 12. The shifting member 21 is provided on its inner surface with an annular rib or projection 24 adapted to contact with the points 19 and 20 to rock the dogs 18 as the shifting member is moved upwardly and downwardly, respectively.

A sleeve member 25 is mounted around the shifting member 21 to form a hand grip adapted to be engaged by the operator when he desires to shift the dogs into and out of engagement with the clutch face 9.

In operation, when the clutch faces are out of engagement with each other, as when the tool has cut through the work or is not in engagement with the work, and the operator desires to rotate the tool it is only necessary for him to raise the shifting member 21 so as to cause the rib 24 to ride up against the points 19 of the dogs 18, thus forcing said dogs into engagement with the clutch face 9 of the socket member 3 of the chuck and making a connection from the member 2, through the sleeve 12 and dogs 18, to the member 3. When it is desired to break this drive connection it is only necessary for the operator to release his grip on the member 21 and it will fall by gravity and strike the points 20 on the dogs 18, thus rocking the dogs about their pivots and disengaging them from the clutch face 9.

While I have shown only one preferrd form of my invention, it will be understood that I do not wish to be limited to this specific construction since various modifications may be made without departing from the scope of my invention as defined in the appended claims.

I claim—

1. A chuck comprising a shank member and a separate socket member, said shank and said socket members being provided with cooperating clutch faces on their inner ends, a spring adapted to normally force said shank and socket members away from each other, said clutch faces being adapted to engage each other when the tool carried by the chuck engages the work and to be automatically disengaged when the tool passes through the work or is disengaged therefrom, and means controlled by the operator for forming a driving connection between said shank and socket members when their clutch faces are disengaged and without stopping the rotation of said shank member.

2. A chuck comprising a shank member and a separate socket member, said shank and said socket members being provided with co-operating clutch faces on their inner ends, a spring adapted to normally force said shank and socket members away from each other, said clutch faces being adapted to engage each other when the tool carried by the chuck engages the work and to be automatically disengaged when the tool passes through the work or is disengaged therefrom, a sleeve secured to the periphery of said shank member and slidably engaging said socket member, means for limiting the vertical movement of said socket member relative to said sleeve, and means on said sleeve controlled by the opreator for forming a driving connection between the shank and socket members when their clutch faces are disengaged and without stopping the rotation of said shank members.

3. A chuck comprising a shank member and a separate socket member, said shank and said socket members being provided with cooperating clutch faces on their inner ends, a spring adapted to normally force said shank and socket members away from each other, said clutch faces being adapted to engage each other when the tool carried by the chuck engages the work and to be automatically disengaged when the tool passes through the work or is disengaged therefrom, a sleeve secured to the periphery of said shank member and slidably engaging said socket member, means for limiting the vertical movement of said sleeve relative to said socket member, clutch dogs pivotally mounted in slots in said sleeve and adapted to be engaged with and disengaged from the clutch face on said socket member to form a driving connection between the shank and socket members when their clutch faces are disengaged, and means controlled by the operator for operating said clutch dogs.

4. A chuck comprising a shank member and a separate socket member, said shank and said socket members being provided with cooperating clutch faces on their inner ends, a spring adapted to normally force said shank and socket members away from each other, said clutch faces being adapted to engage each other when the tool carried by the chuck engages the work and to be automatically disengaged when the tool passes through the work or is disengaged therefrom, a sleeve secured to the periphery of said shank member and slidably engaging said socket member, means for limiting the vertical movement of said sleeve relative to said socket member, clutch dogs pivotally mounted in slots in said sleeve and adapted to be engaged with and disengaged from the clutch face on said socket member to form a driving connection between the shank and socket members when their clutch faces are disengaged, and a manually reciprocable shifting member slidably mounted on said sleeve for a limited movement, said member being adapted to shift said clutch dogs into and out of engagement with the clutch face on said socket member.

5. A drill chuck comprising a shank member adapted to be continuously rotated and a separate socket member, said shank member and said socket member each being provided with centrally arranged recesses opening from their inner ends, a guide pin mounted in said recesses and adapted to maintain said shank and socket members in alinment, said shank and said socket members being provided with cooperating clutch faces on their inner ends, a spring normally adapted to force said shank and socket members away from each other, said clutch faces being adapted to engage each other when the drill carried by the chuck engages the work and to be automatically disengaged when the drill passes through the work or is disengaged therefrom, a sleeve secured to the periphery of said shank member and slidably engaging said socket member, means for limiting the vertical movement of said sleeve, and means controlled by the operator for forming a driving connection between the shank and socket members when their clutch faces are disengaged and without stopping the rotation of said shank member.

6. A drill chuck comprising a shank member adapted to be continuously rotated and a separate socket member, said shank member and said socket member each being provided with centrally arranged recesses opening from their inner ends, a guide pin mounted in said recesses and adapted to maintain said shank and socket members in alinement, said shank and said socket members being provided with cooperating clutch faces on their inner ends, a spring normally adapted to force said shank and socket members away from each other, said clutch faces being adapted to engage each other when the drill carried by the chuck engages the work and to be automatically disengaged when the drill passes through the work or is disengaged therefrom, and means controlled by the operator for forming a driving connection between the shank and socket members when their clutch faces are disengaged and without stopping the rotation of said shank member.

In testimony whereof I have hereunto signed my name.

JAMES L. BERNARD.